United States Patent [19]

Honsberg

[11] 4,431,776

[45] Feb. 14, 1984

[54] FAST-CURING OLEFIN COPOLYMER RUBBER COMPOSITIONS

[75] Inventor: Wolfgang Honsberg, Wilmington, Del.

[73] Assignee: E. I. Du Pont de Nemours and Company, Wilmington, Del.

[21] Appl. No.: 394,328

[22] Filed: Jul. 1, 1982

[51] Int. Cl.³ .............. C08L 23/34; C08L 23/16; C08J 3/24

[52] U.S. Cl. .................... 525/194; 525/192; 525/211; 525/240; 525/382

[58] Field of Search .......... 525/192, 194, 211, 240, 525/382

[56] References Cited

U.S. PATENT DOCUMENTS

| | | | |
|---|---|---|---|
| 3,001,965 | 9/1961 | Kalil et al. | 260/28.5 |
| 3,104,235 | 9/1963 | Kuntz et al. | 525/382 |
| 3,278,480 | 10/1966 | Radcliff et al. | 260/41 |
| 3,351,677 | 11/1967 | Barton et al. | 525/382 |
| 3,565,974 | 2/1971 | Ohnuma et al. | 525/382 |
| 4,125,509 | 11/1978 | Vostovich | 525/192 |

FOREIGN PATENT DOCUMENTS 2265816  4/1977  France.
1034626 10/1979  Italy.

*Primary Examiner*—Carman J. Seccuro

[57] ABSTRACT

An elastomeric composition comprising an EPDM copolymer rubber; a sulfur curative for the copolymer rubber; about 5–15 parts by weight per 100 parts copolymer rubber of a chlorosulfonated polyolefin which contains 20–50 weight percent chlorine and 0.2–1.5 weight percent sulfur; and about 0.25–1 parts by weight per 100 parts copolymer rubber of a diamine-generating curing agent.

16 Claims, No Drawings

FAST-CURING OLEFIN COPOLYMER RUBBER COMPOSITIONS

BACKGROUND OF THE INVENTION

This invention relates to fast-curing elastomeric compositions wherein the principal elastomer is an α-olefin copolymer rubber.

In the process of mixing, shaping and curing elastomeric materials to produce a wide variety of useful rubber products it is economically attractive to shorten the time required for the vulcanization step without unduly shortening the time available for mixing and shaping the uncured stock. Such a reduction in vulcanization time not only allows increased productivity of molds and presses but frequently allows reduction of the size, and thus the cost, of molten salt or metal baths which are used to cure long lengths of products such as rubber covered cables and hoses.

In the case of curing an ethylene, propylene nonconjugated diene rubber, (EPDM rubber), it is known that addition of a chlorosulfonated polyolefin to the usual sulfur curable composition will increase the rate of cure and the level of cure attainable. The present invention provides an ethylene, propylene, nonconjugated diene rubber composition containing a chlorosulfonated polyolefin which cures in even shorter time to products which can be removed from presses or curing baths without damage. If desirable these elastomeric products can be cured further in conventional air ovens.

SUMMARY OF THE INVENTION

The present invention is directed to an EPDM rubber composition showing an increased rate of cure. The elastomeric composition comprises an ethylene, propylene nonconjugated diene copolymer rubber (EPDM); a sulfur curative for the copolymer rubber; about 5–15 parts by weight per 100 parts copolymer rubber of a chlorosulfonated polyolefin which contains 20–50 weight percent chlorine and 0.2–1.5 weight percent sulfur; and about 0.25–1 parts by weight per 100 parts copolymer rubber of a diamine-generating curing agent. The curable composition is prepared by intimately mixing, in for example an internal mixer, the EPDM copolymer rubber; a sulfur curative for the copolymer rubber; about 5–15 parts by weight per 100 parts copolymer rubber of a chlorosulfonated polyolefin which contains 20–50 weight percent chlorine and 0.2–1.5 weight percent sulfur; and about 0.25–1 parts by weight per 100 parts copolymer rubber of a diamine-generating curing agent. The composition of this invention can be used in applications in which EPDM copolymer rubbers are used, however, the compositions are especially useful for making long lengths of wire and cable coatings and hose.

DETAILED DESCRIPTION OF PREFERRED EMBODIMENTS

The ethylene, propylene, nonconjugated diene copolymer rubber having an increased rate of cure, generally, contains about 30–75 weight percent ethylene, usually 40–70 weight percent, and about 1–10 weight percent of at least one nonconjugated diene, the balance propylene. The nonconjugated diene is an open chain or cyclic hydrocarbon, usually having 5–22 carbon atoms.

Representative examples of nonconjugated dienes include open chain dienes such as 1,4-hexadiene, 2-methyl-1,5-hexadiene, 1,9-octadecadiene, 11-ethyl-1,11-tridecadiene, 6-methyl-1,5-heptadiene, 7-methyl-1,6-octadiene.

Representative examples of cyclic nonconjugated dienes which can be used are 4-vinyl cyclohexene, 5-methylene-2-norbornene, 5-ethylidene-2-norbornene dicyclopentadiene and tricyclopentadiene. Preferably the diene is either 1,4-hexadiene, or 5-ethylidene-2-norbornene. The methods of preparation, choice of diene, physical properties and vulcanization methods for these EPDM copolymer rubbers are well known and they have been reviewed by F. P. Baldwin and G. Ver Strate [Rubber Chem. Tech. 45, No. 3 pp 709–881 (1972)] and are described in U.S. Pat. Nos. 2,933,480 and 3,819,591.

The sulfur curative used to vulcanize the ethylene, propylene, nonconjugated diene rubber in the composition of this invention can be elemental sulfur or a component that releases sulfur at curing temperatures or mixtures thereof, which compounds are well known in the industry. Representative curing agents that release sulfur at curing temperatures include thiuram polysulfides, amine disulfides, and sodium polysulfide. Usually about 0.2–5 parts by weight per 100 parts EPDM copolymer rubber of sulfur or about 0.6–15 parts by weight per 100 parts EPDM copolymer rubber of compounds that release sulfur are incorporated in the composition.

Optimally, one or more conventional accelerators can be added to the composition in amounts of about 0.1–5 parts by weight per 100 parts EPDM copolymer rubber to improve the cure. The most active accelerators that can be used include 2-mercaptobenzothiazole, thiuram sulfides, dithiocarbamates and their simple derivatives. Representative accelerators include: tetramethyl thiuram monosulfide; tetramethyl thiuram disulfide; tellurium monosulfide; tellurium diethyldithiocarbamate; the zinc salt of dimethyl dithiocarbamic acid; 2-mercaptothiazoline; 2-mercaptothiazole; 2-mercaptobenzothiazole; N,N-diethyl-thiocarbamyl-2-mercaptobenzothiazole; and 2,2'dithiobis benzothiazole.

The chlorosulfonated polyolefin used in the present composition can be any of those well known elastomers prepared by the reaction of a chlorosulfonating agent, (such as a mixture of chlorine and sulfur dioxide gases or sulfuryl chloride) with a saturated hydrocarbon polymer, such as polyethylene or polypropylene, or a copolymer of ethylene containing minor amounts, e.g., up to about 10% by weight, of other ethylenically unsaturated monomers copolymerizable therewith, especially lower alkenes of 3–8 carbon atoms such as propylene, butene, hexene or octene, or other monomers such as vinyl acetate, acrylic acid or methacrylic acid. The polyolefin, preferably polyethylene, can be either the lower density, high-pressure type or the higher density homo- or copolymer type prepared with a coordination catalyst at lower pressure. The number average molecular weight of the chlorosulfonated polyolefin is usually at least 10,000. The chlorosulfonation reaction is controlled to produce a polymer product which contains 20–50 weight percent chlorine and 0.2 to 1.5 weight percent sulfur, the latter being in the form of sulfonyl chloride groups attached to the saturated hydrocarbon chain. Representative polymers of this type and methods for their preparation are well known and described in U.S. Pat. Nos. 2,586,363, 2,879,251, 2,982,759 and 3,542,747.

The composition of this invention contains about 5–15 parts by weight of chlorosulfonated polyolefin per 100 parts by weight EPDM copolymer rubber. If much more than 15 parts by weight is used the composition has a tendency to scorch, i.e. cure prematurely, and this larger amount adds unnecessarily to the cost of the composition. If less than about 5 parts chlorosulfonated polyolefin per 100 parts by weight EPDM copolymer rubber is used, the sought after effect of a rapid cure is not obtained.

The elastomeric compositions of the present invention must contain a diamine-generating curing agent that is present in an amount of about 0.25-1.5, preferably 0.5-0.75, parts by weight per hundred parts EPDM copolymer rubber. The diamine-generating compound cures the chlorosulfonated polyolefin. The curing agent is a compound which generates an aliphatic or cyclo aliphatic diamine when it is exposed to heat alone or a combination of heat and moisture. The procedure used to cure the composition of this invention is the same as conventional sulfur curing procedures used with EPDM copolymers. Generally, the curing temperatures are within a range of about 140° C.-160° C. The diamine-generating curing agent can be represented by the formula $(RCH=N)_2A$, or $(RR'—C=N)_2A$ or $^+NH_3—A—NHCOO^-$ where A is an aliphatic or cycloaliphatic radical, usually containing 2-15 carbon atoms, and R and R' are alkyl, cycloalkyl, aryl, aralkyl, or aralkenyl radicals, usually containing 2-10 carbon atoms.

These diamine-generating compounds are well known condensation products made by reacting the diamine with an aldehyde or ketone or carbon dioxide. The diamine components of the condensation products have the general formula $A(NH_2)_2$ where A has the value given above. Representative examples include trimethylene diamine, hexamethylene diamine or bis(-cyclohexyl)methyl diamine. The aldehyde or ketone portion of the condensation products has the general formula:

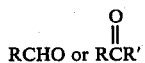

where R and R' have the same values given above. Representative examples of such compounds are acetaldehyde, acetone, methylethyl ketone, benzaldehyde, phenylacetaldehyde and cinnamaldehyde.

Representative examples of diamine-generating curing agents produced by a condensation reaction of a diamine and carbon dioxide that are useful in this invention and represented by the formula $^+NH_3—A—NHCOO^-$ include: trimethylene diamine carbamate, pentamethylene diamine carbamate, hexamethylene diamine carbamate, heptamethylene diamine carbamate, decamethylene diamine carbamate, isopropylidene diamine carbamate and 4,4'-methylenebis-(cyclohexylamine) carbamate.

Representative examples of diamine-generating curing agents produced by a condensation reaction of a diamine and an aldehyde and represented by the formula $(RCH=N)_2A$ include:
N,N'-diethylidene-1,6-hexanediamine,
N,N'-dihexylidene-1,3-propanediamine,
N,N'-dibenzylidene-1,6-hexanediamine,
N,N'-dicinnamylidene-1,3-propanediamine,
N,N'-dicinnamylidene-1,6-hexanediamine,
N,N'-bis(3-pentylbenzylidene)ethylenediamine,
N,N'-bis(2-methoxybenzylidene)1,3-propanediamine.

Representative examples of diamine-generating curing agents produced by a condensation reaction of a diamine and ketone and represented by the formula $(RR'—C=N)A$ include:
N,N'-diisopropylidene-1,6-hexanediamine,
N,N'-diisopropylidene-1,3-propanediamine,
N,N'-dicyclohexylidene-1,6-hexanediamine.

The preferred diamine-generating curing agents are diamine carbamates having the formula represented by the inner salt $^+NH_3—A—NHCOO^-$ where A is an aliphatic or cycloaliphatic radical containing 2-15 carbon atoms. The most preferred diamine generators are hexamethylene diamine carbamate and [4,4'-methylene-bis-(cyclohexylamine carbamate].

The elastomeric compositions of this invention can also contain conventional fillers used in EPDM copolymer rubber and chlorosulfonated polyolefin compositions such as carbon black or mineral fillers, processing aids such as petroleum oil or fatty acids or their salts, and conventional stabilizers against light, heat or oxidative degradation.

The curable composition is prepared by mixing all the necessary and optional ingredients on, for example, a two-roll rubber mill, in an internal mixer or in a mixing extruder at a temperature below that which is required to generate the diamine from the diamine-generating curing agent, usually about 20°-40° C., and then cooling to about room temperature, if necessary. Final shaping and vulcanization are carried out in suitable molds at elevated temperature and pressure.

The invention is illustrated by the following examples.

EXAMPLES 1-7 AND COMPARATIVE EXAMPLES

The ingredients listed in the table below were thoroughly mixed on a two-roll rubber mill at a temperature of 24°-38° C. Portions of the mixture were tested for curing characteristics in an oscillating disc cure meter (ASTM 2084-75) and other portions were press-cured in a mold for 5 minutes at 160° C. The vulcanized samples from the press cure were tested for stress-strain properties by the procedure of ASTM D412-75. The test results show that the compositions containing amine-generating compounds cure more rapidly and completely (higher torque for a given time or higher stress for a given elongation) than comparative compositions which did not contain these compounds. The amounts given in the table are in parts by weight per 100 parts EPDM rubber.

EXAMPLES

|  | 1 | 2 | 3 | 4 | Comparative Example |
|---|---|---|---|---|---|
| EPDM[1] | 100 | 100 | 100 | 100 | 100 |
| Chlorosulfonated Polyethylene[2] | 11.1 | 11.1 | 11.1 | 11.1 | 11.1 |
| SRF Carbon Black | 88.9 | 88.9 | 88.9 | 88.9 | 88.9 |
| Paraffinic Process Oil | 22.2 | 22.2 | 22.2 | 22.2 | 22.2 |
| Zinc Oxide | 5.6 | 5.6 | 5.6 | 5.6 | 5.6 |
| Stearic Acid | 1.1 | 1.1 | 1.1 | 1.1 | 1.1 |
| Sulfur | 2.2 | 2.2 | 2.2 | 2.2 | 2.2 |
| 2-Mercaptobenzothiazole | 1.1 | 1.1 | 1.1 | 1.1 | 1.1 |
| Tetramethylthiuram disulfide | 0.55 | 0.55 | 0.55 | 0.55 | 0.55 |
| Tellurium diethyldithiocarbamate | 0.55 | 0.55 | 0.55 | 0.55 | 0.55 |
| Zinc dibutyldithio- | 2.2 | 2.2 | 2.2 | 2.2 | 2.2 |

|  | -continued | | | |  |
|---|---|---|---|---|---|
| carbamate |  |  |  |  |  |
| Calcium oxide | — | 11.1 | 11.1 | 11.1 | — |
| Hexamethylenediamine carbamate | 0.55 | 0.55 | 0.55 | — | — |
| [N,N'—dicinnamylidene-1,6-hexanediamine] | — | — | — | 1.2 | — |
| Diphenylguanidine | 0.55 | 0.55 | 0.55 | 0.55 | — |
| m-Phenylene-bis-maleimide | — | — | 2.2 | 2.2 | — |
| ODR at 160° C. (ASTM D-2084-75) | | | | | |
| Torque at 1 min (N · m) | 1.64 | 1.92 | 2.09 | 1.5 | 1.18 |
| 2 min | 3.16 | 3.73 | 4.66 | 3.4 | 1.58 |
| 3 min | 3.95 | 4.52 | 5.55 | 4.4 | 3.39 |
| 5 min | 4.76 | 5.40 | 6.66 | 5.2 | 4.69 |
| Press Cure 5 min at 160° C. | | | | | |
| Stress at 100% Elongation (MPa) | 3.44 | 3.4 | 3.8 | 3.10 | 2.7 |
| Stress at 200% Elongation (MPa) | 8.96 | 8.96 | 10.0 | 6.55 | 6.5 |
| Stress at Break (MPa) | 14.5 | 14.8 | 15.8 | 10.1 | 13.4 |
| Elongation at Break (%) | 320 | 325 | 335 | 325 | 400 |

|  | 5 | 6 | 7 | Comparative Examples | |
|---|---|---|---|---|---|
| EPDM[1] | 100 | 100 | 100 | 100 | 100 |
| Chlorosulfonated Polyethylene[2] | 11.1 | 11.1 | 11.1 | 11.1 | 11.1 |
| SRF Carbon Black | 88.9 | 88.9 | 88.9 | 88.9 | 88.9 |
| Paraffinic Process Oil | 22.2 | 22.2 | 22.2 | 22.2 | 22.2 |
| Zinc Oxide | 5.6 | 5.6 | 5.6 | 5.6 | 5.6 |
| Stearic Acid | 1.1 | 1.1 | 1.1 | 1.1 | 1.1 |
| Sulfur | 2.2 | 2.2 | 2.2 | 2.2 | 2.2 |
| 2-Mercaptobenzothiazole | 1.67 | 1.67 | 1.67 | 1.67 | 1.67 |
| Tetramethylthiuram disulfide | 0.89 | 0.89 | 0.89 | 0.89 | 0.89 |
| Dipentamethylene thiuram hexasulfide | 0.89 | 0.89 | 0.89 | 0.89 | 0.89 |
| Tellurium diethyldithiocarbamate | 0.89 | 0.89 | 0.89 | 0.89 | 0.89 |
| Calcium oxide | — | — | 11.1 | 11.1 | — |
| Hexamethylenediamine carbamate | 0.55 | — | 0.55 | — | — |
| [4,4'-methylenebis-(cyclohexylamine) carbamate] | — | 0.89 | — | — | — |
| Diphenylguanidine | 0.55 | 0.55 | 0.55 | 0.55 | — |
| m-Phenylene-bis-maleimide | 2.2 | 2.2 | 2.2 | 2.2 | — |
| ODR at 160° C. (ASTM D-2084-75) | | | | | |
| Torque at 1 min (N · m) | 1.49 | 1.3 | 1.58 | 1.43 | 1.33 |
| 2 min | 3.16 | 2.8 | 3.61 | 2.03 | 1.56 |
| 3 min | 4.18 | 4.1 | 4.63 | 3.69 | 2.94 |
| 5 min | 5.08 | 5.0 | 5.64 | 5.34 | 4.4 |
| Press Cure 5 min at 160° C. | | | | | |
| Stress at 100% Elongation (MPa) | 5.5 | 3.10 | 3.4 | 3.4 | 3.4 |
| Stress at 200% Elongation (MPa) | 12.4 | 6.21 | 8.3 | 7.6 | 7.6 |
| Stress at Break (MPa) | 17.9 | 9.31 | 15.2 | 14.5 | 14.5 |
| Elongation at Break (%) | 305 | 300 | 340 | 365 | 420 |

Footnotes to Table
[1] Copolymer of ethylene (44 weight percent), propylene (32 weight percent) and 1,4-hexadiene (4 weight percent)
[2] 35 weight percent Cl, 1 weight percent S (Linear PE, 4.0 MI)

I claim:

1. An elastomeric composition comprising an ethylene, propylene, nonconjugated diene copolymer rubber; a sulfur curative for the copolymer rubber; about 5-15 parts by weight per 100 parts copolymer rubber of a chlorosulfonated polyolefin which contains 20-50 weight percent chlorine and 0.2-1.5 weight percent sulfur; and about 0.25-1 parts by weight per 100 parts copolymer rubber of a diamine-generating curing agent.

2. An elastomeric composition of claim 1 wherein the diamine-generating curing agent has the formula:

$(RCH=N)_2A$, 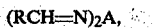

$(RR'-C=N)_2A$ or 

$^+NH_3-A-NHCOO^-$ 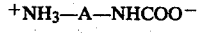

where A is an aliphatic or cycloaliphatic radical containing 2-15 carbon atoms and R and R' are alkyl, cycloalkyl, aryl, aralkyl, or aralkenyl radicals containing 2-10 carbon atoms.

3. An elastomeric composition of claim 1 where the diamine-generating curing agents are diamine carbamates having the formula $^+NH_3-A-NHCOO^-$ where A is an aliphatic or cycloaliphatic radical containing 2-15 carbon atoms.

4. An elastomeric composition of claim 1 where the diamine-generating curing agent is hexamethylenediamine carbamate.

5. An elastomeric composition of claim 1 where the diamine-generating curing agent is [4,4'-methylenebis-(cyclohexylamine)carbamate].

6. An elastomeric composition of claim 1 where the diamine-generating curing agent is [N,N'-dicinnamylidene-1,6-hexanediamine].

7. An elastomeric composition of claims 1 or 2 where the chlorosulfonated polyolefin is chlorosulfonated polyethylene.

8. An elastomeric composition of claims 1 or 7 where the nonconjugated diene is 1,4-hexadiene and the diamine-generating curing agent is hexamethylene diamine carbamate or [4,4'-methylenebis(cyclohexylamine)carbamate].

9. In a process for preparing a curable composition which comprises intimately mixing an ethylene, propylene, nonconjugated diene copolymer rubber; a sulfur curative for the copolymer rubber; about 5-15 parts by weight per 100 parts copolymer rubber of chlorosulfonated polyolefin which contains 20-50 weight percent chlorine and 0.2-1.5 weight percent sulfur; the improvement which comprises incorporating into the copolymer rubber about 0.25-1 parts by weight per 100 parts copolymer rubber of a diamine-generating curing agent.

10. The process of claim 9 wherein diamine-generating curing agent is selected from the group:

$(RCH=N)_2A$, 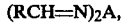

$(RR'-C=N)_2A$ or 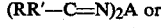

$^+NH_3-A-NHCOO^-$ 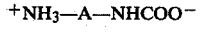

where A is an aliphatic or cycloaliphatic radical containing 2-15 carbon atoms and R and R' are alkyl, cycloalkyl, aryl, aralkyl, or aralkenyl radicals containing 2-10 carbon atoms.

11. The process of claim 9 wherein the diamine-generating curing agents are diamine carbamates having the formula $^+NH_3-A-NHCOO^-$ where A is an aliphatic or cycloaliphatic radical containing 2-15 carbon atoms.

12. The process of claim 9 wherein the diamine-generating curing agent is hexamethylenediamine carbamate.

13. The process of claim 9 where the diamine-generating curing agent is [4,4'-methylenebis(cyclohexylamine) carbamate].

14. The process of claim 9 where the diamine-generating curing agent is [N,N'-dicinnamylidene-1,6-hexanediamine].

15. The process of claims 9 or 10 wherein the chlorosulfonated polyolefin is chlorosulfonated polyethylene.

16. The process of claims 9 or 15 wherein the nonconjugated diene is 1,4-hexadiene, and the diamine-generating curing agent is hexamethylene diamine carbamate or [4,4'-methylenebis(cyclohexylamine) carbamate].

* * * * *